Patented Sept. 10, 1940

2,214,070

UNITED STATES PATENT OFFICE 2,214,070

METHOD FOR THE PURIFICATION OF CELLULOSE ETHERS

Harold M. Spurlin, Wilmington, Del., assignor to Hercules Powder Company, Wilmington, Del., a corporation of Delaware No Drawing. Application November 30, 1938, Serial No. 243,122

5 Claims. (Cl. 260—232)

This invention relates to an improved method for the purification of cellulose ethers and more particularly it relates to an improved method for the purification of ethyl cellulose having an ethoxyl content of about 38% to about 54%.

Ethyl cellulose is prepared by reacting cellulose, alkali, and an etherifying agent until an average desired degree of ethylation is attained and then recovering the ethyl cellulose by precipitation. The crude ethyl cellulose contains unreacted and partially reacted cellulose fibers and other impurities which cause graininess and haze in solutions. Because of the heterogeneous nature of the preparation reaction, the degree of etherification is not uniform; as a result, there are present numerous particles of partially reacted cellulose which are partially soluble. These particles form small gelatinous masses in solution giving rise to graininess and causing films cast from the solution to be weak.

A method of purifying ethyl cellulose is disclosed by Dörr, Leuchs, and Rosenthal in U. S. Patent 1,814,208 according to which the ethyl cellulose is dissolved in hydrocarbon solvents which dissolve it when hot, but not in the cold. The hot solution is filtered and then cooled, precipitating the ethyl cellulose. This method removes fibers, coarse impurities, and part of the haze. However, it has been found that it does not remove the small gelatinous masses which cause granularity in solution. In the filtration step, if a coarse filter is used, the gelatinous masses go through it, and if a fine filter is used, it is quickly plugged by the particles.

This invention is an improvement of the method of Dörr and his associates with the object not only of more completely and more easily removing fibers, coarse particles, and haze, but also with the further object of removing the partially soluble granular gelatinous portions outside the range of desired substitution.

According to this invention, ethyl cellulose is dissolved by heating in a solvent which dissolves it when hot, but which does not completely dissolve it in the cold. The hot solution is then cooled until a portion of the ethyl cellulose precipitates. This precipitate is then separated from the hot clear solution from which, in turn, the major portion of the ethyl cellulose is recovered. Recovery may be accomplished by further cooling the hot solution and separating the ethyl cellulose thereby precipitated, or by other suitable means. After drying, there is obtained a uniform white product, which dissolves in the customary solvents to give a clear, substantially colorless solution, free from granularity. The undesired portion having border-line solubility has been eliminated as this is the portion precipitated first.

The ethyl cellulose which may be purified according to this invention may be one having an ethoxy content in the range from about 38% to about 54%. The crude ethyl cellulose is dissolved in a solvent or solvent mixture which will vary somewhat with the ethoxy content of the particular ethyl cellulose being purified. In general, suitable solvents, that is, solvents which have the property of dissolving ethyl cellulose when hot but precipitating it when cooled, may be aliphatic and aromatic hydrocarbons, including hydroaromatic and other cyclic hydrocarbons, and petroleum hydrocarbons derived from both paraffin and asphalt base mineral oils, or mixtures thereof. For the lower substituted types of ethyl cellulose with an ethoxy content of about 41% to about 44% benzene or toluene, or mixtures of benzene or toluene with other hydrocarbons, may be used. For types of still lower substitution, i. e., with an ethoxy content of about 38% to about 41%, mixtures of an alcohol, for example, methyl, ethyl, or butyl alcohol, with hydrocarbons are suitable. For types more highly substituted, i. e., with an ethoxy content of about 44% to about 54%, solvents containing aliphatic hydrocarbons are called for. These may be mixtures, for example, of benzene and hexane or the like, or they may be asphalt base petroleum fractions or other petroleum hydrocarbons containing cyclic compounds, or hydrogenated petroleum fractions which may or may not have been cracked or reformed, or they may be mixtures thereof.

To determine a suitable solvent mixture for ethyl cellulose of a given ethoxy content, the ethyl cellulose may be boiled under reflux or may be heated at a suitable temperature such as 100 C. or 120 C. in a solvent, for example, an aliphatic hydrocarbon or a petroleum hydrocarbon, which does not completely dissolve it at that temperature. An aromatic hydrocarbon is then added in small portions with continued heating and stirring. A suitable mixture is obtained when the minimum quantity to bring about substantially complete solution has been added. In general, the higher the ethoxy content, the higher should be the aliphatic hydrocarbon content of the solvent. The various types of hydrocarbons derived from mineral oils have properties equivalent to the various mixtures of an aliphatic and an aromatic hydrocarbon. In determining a suitable solvent for an ethyl cellulose of a relatively low degree of substitution, say with an ethoxy content of about 39%, the ethyl cellulose is first heated with an aromatic hydrocarbon or a mixture containing an aromatic hydrocarbon, and small portions of an alcohol are added until substantially complete solution at the elevated temperature occurs. The boiling point of the solvent or solvent mixture may vary within wide limits, say about 80° C. to about 170° C. but a convenient range is from about 80° C. to about 120° C.

The ethyl cellulose is dissolved in the hereinabove described solvent by heating, preferably at a temperature in the range from about 80° C. to about 120° C. Desirably the mixture will be agitated. The solvent may conveniently be preheated before adding the ethyl cellulose. The hot solution resulting is then cooled sufficiently to precipitate a portion of the ethyl cellulose, for example, about 20° C. The least soluble portion precipitates and is separated by settling and decantation or by centrifuging. The precipitate carries with it fibers and haze-forming material. The precipitate is usually somewhat gelatinous but it has the property of settling out in about 15 minutes to about 4 hours and it may be centrifuged without being settled. The major portion of the ethyl cellulose is then recovered from the clear hot solution by any suitable means. For example, the solution may be cooled to 15° or 20° C., thereby precipitating most of the ethyl cellulose which may be removed by straining, decanting or centrifuging. The ethyl cellulose may then be dried or it may be redissolved in a suitable solvent and precipitated in any desired manner.

The cooled solvent contains dissolved low viscosity ethyl cellulose, useful as such, which may be recovered by precipitation with a mixture of steam and water or other means. Or, the cooled solvent may be heated and reused without removal of the residual ethyl cellulose, if desired. Alternatively, the hot clear solution from which the first precipitate has been separated, may be treated to recover all the ethyl cellulose it contains by steam precipitation, removal of the solvent by distillation, or by other means. Thus, the portion of low viscosity ethyl cellulose which remains in solution in the cold may be left in the product or it may be removed from the ethyl cellulose, as desired. Accumulations of the initial precipitate can be again treated by the method of this invention to recover most of the useful ethyl cellulose they may contain.

The following examples are specific embodiments to illustrate more fully the process of this invention:

Example 1

Twenty parts by weight of a crude ethyl cellulose of an average ethoxy content of 47%, which gave cloudy, granular, yellow solutions, were dissolved in 2,000 parts by weight of hydrocarbon solvent known commercially as "Varnish makers' and painters' naphtha," by heating above 100° C. with agitation. The solution was cooled until a small quantity of ethyl cellulose came out of solution and it was then held at constant temperature until the precipitate settled out. The clear supernatant liquid was decanted. The ethyl collulose in solution in this liquid was precipitated by passing the solution through a small orifice into a rapidly moving stream of mixed steam and water. The precipitated ethyl cellulose was then dried, there being obtained a yield of 18 parts by weight of the purified product. The purified ethyl cellulose gave clear solutions, slightly yellow in color, in the usual solvents. It gave smooth, clear, tough and flexible films on drying from solution, as contrasted with the hazy, rough and somewhat brittle films given by the original crude material.

Example 2

One hundred parts by weight of the same lot of crude ethyl cellulose used in Example 1 were dissolved in 2,000 parts of the hydrocarbon solvent known commercially as "Varnish makers' and painters' naphtha," by heating at above 100° C. with agitation. Upon cooling to 90° C., a precipitate, which will be called precipitate A, formed and was allowed to settle out. The clear supernatant liquid was decanted off and cooled to room temperature forming a second precipitate, this time of purified ethyl cellulose. The supernatant liquid was decanted from the second precipitate, after settling, and used to redissolve precipitate A, at slightly above 100° C. The new solution was cooled to 90° C. The precipitate formed, designated $A^1$, was allowed to settle and the supernatant liquid decanted. The supernatant liquid, upon cooling to room temperature, yielded a second precipitate of purified ethyl cellulose. The precipitate was allowed to settle and the supernatant liquid so formed was utilized to redissolve precipitate $A^1$. The above process was repeated until 8 portions of purified ethyl cellulose, totalling 88 parts by weight after drying, had been obtained. The purified ethyl cellulose gave clear solutions, slightly yellow in color, in the usual solvents. It gave smooth, clear, tough and flexible films on drying from solution.

Example 3

Fifty parts of crude ethyl cellulose of an average ethoxy content of 50% were dissolved by heating in 2,000 parts by weight of commercial mixed heptanes. The ethyl cellulose went into solution at 90° C. Upon cooling the solution to 70° C. and holding it at that temperature, a separation into a clear supernatant liquid and a cloudy settled layer was obtained. The clear supernatant liquid was decanted and cooled to 20° C., causing separation of purified ethyl cellulose. The precipitated purified ethyl cellulose was allowed to settle and the supernatant liquid decanted. The purified ethyl cellulose gave colorless solutions free of fibers, haze, and granularity. It gave smooth, clear, tough and flexible films on drying from solution. A portion of the original ethyl cellulose remained dissolved in the heptane at 20° C. This portion, upon being precipitated and dried, was found to give clear, colorless solutions of low viscosity, and clear but brittle films. The residue insoluble at 70° C. was combined with residues from other similar purification treatments and again treated by dissolving in hot heptane, cooling, etc., as hereinbefore described for the original crude ethyl cellulose.

Example 4

Fifty parts by weight of crude ethyl cellulose of an average ethoxy content of 44% was subjected to the action of a mixture of 2,000 parts by weight of toluene and 200 parts by weight of commercial heptane at the boiling point of the mixture, which was slightly above 100° C. The ethyl cellulose dissolved except for a small quantity of unfilterable white floc. Upon cooling the solution to 70° C. and holding it at that temperature, a separation into a clear supernatant liquid and a cloudy settled layer was obtained. The clear supernatant liquid was decanted and cooled to 20° C., causing separation of purified ethyl cellulose. The precipitate of purified ethyl cellulose was allowed to settle and the supernatant liquid decanted. The purified ethyl cellulose gave colorless solutions, free of fibers, haze, and granularity. It gave smooth, clear, tough and flexible films on drying from solution. The supernatant liquid obtained at 20° C. was returned to the process. The residue insoluble at 70° C. was combined with residues from other similar purification treatments and again treated by dissolving in hot mixed solvent, cooling, etc., as hereinabove described for the original crude ethyl cellulose.

It is evident from the examples that the practice of this invention removes the semi-soluble portions of ethyl cellulose which are gelatinous and grainy in solution. In precipitating these portions and separating the precipitate, fibers and other haze are dragged down. Their removal is thus accomplished in a manner which is simpler and less costly than filtration. The method according to this invention has the valuable advantage of producing ethyl cellulose capable of giving clear, smooth solutions from a crude non-uniform reaction product in a simple and inexpensive manner. Thus it allows the use of very economical preparation processes of the type which consume very small excesses of etherifying agent, and which are rapid, but which give non-uniform reaction products.

It will be understood that the details and examples hereinbefore set forth are illustrative only, and that the invention as broadly described and claimed is in no way limited thereby.

What I claim and desire to protect by Letters Patent is:

1. A method for the purification of ethyl cellulose having an ethoxyl content in the range from about 38% to about 54% and containing particles of partially reacted cellulose giving rise to graininess in solutions of the ethyl cellulose, which comprises dissolving the ethyl cellulose in a solvent which dissolves it when hot but which does not completely dissolve it in the cold, cooling the resulting hot solution sufficiently to precipitate a portion of the ethyl cellulose, whereby grain-forming material and any undissolved particles and fibres present form a common flocculated precipitate, separating the precipitated portion from the hot solution, and recovering the major portion of the ethyl cellulose from the resulting hot clear solution, whereby there is obtained purified ethyl cellulose which gives clear, grainless solutions and tough films.

2. A method for the purification of ethyl cellulose having an ethoxyl content in the range from about 38% to about 54% and containing particles of partially reacted cellulose giving rise to graininess in solutions of the ethyl cellulose, which comprises dissolving the ethyl cellulose in a solvent which dissolves it when hot but which does not completely dissolve it in the cold, cooling the resulting hot solution sufficiently to precipitate a portion of the ethyl cellulose, whereby grain-forming material and any undissolved particles and fibres present form a common flocculated precipitate, separating the precipitated portion from the hot solution, and recovering the major portion of the ethyl cellulose from the resulting hot clear solution by cooling said solution further to precipitate purified ethyl cellulose, and separating the purified ethyl cellulose from the resulting solution, whereby there is obtained purified ethyl cellulose which gives clear, grainless solutions and tough films.

3. A method for the purification of ethyl cellulose having an ethoxyl content in the range from about 38% to about 54% and containing particles of partially reacted cellulose giving rise to graininess in solutions of the ethyl cellulose, which comprises dissolving the ethyl cellulose in a solvent consisting substantially essentially of hydrocarbons, said solvent dissolving the ethyl cellulose when hot but not completely dissolving it in the cold, cooling the resulting hot solution sufficiently to precipitate a portion of the ethyl cellulose, whereby grain-forming material and any undissolved particles and fibres present form a common flocculated precipitate, separating the precipitated portion from the hot solution, and recovering the major portion of the ethyl cellulose from the resulting hot clear solution, whereby there is obtained purified ethyl cellulose which gives clear, grainless solutions and tough films.

4. A method for the purification of ethyl cellulose having an ethoxyl content in the range between about 44% and about 54% and containing particles of partially reacted cellulose giving rise to graininess in solutions of the ethyl cellulose, which comprises dissolving the ethyl cellulose in a solvent consisting substantially essentially of hydrocarbons derived from petroleum, said solvent dissolving the ethyl cellulose when hot but not completely dissolving it in the cold, cooling the resulting hot solution sufficiently to precipitate a portion of the ethyl cellulose, whereby grain-forming material and any undissolved particles and fibres present form a common flocculated precipitate, separating the precipitated portion from the hot solution, and recovering the major portion of the ethyl cellulose from the resulting hot clear solution, whereby there is obtained purified ethyl cellulose which gives clear, grainless solutions and tough films.

5. A method for the purification of ethyl cellulose having an ethoxyl content in the range between about 44% and about 54% and containing particles of partially reacted cellulose giving rise to graininess in solutions of the ethyl cellulose, which comprises dissolving the ethyl cellulose in a solvent consisting substantially essentially of hydrocarbons derived from petroleum, said solvent dissolving the ethyl cellulose when hot but not completely dissolving it in the cold, cooling the resulting hot solution sufficiently to precipitate a portion of the ethyl cellulose, whereby grain-forming material and any undissolved particles and fibres present form a common flocculated precipitate, separating the precipitated portion from the hot solution, and recovering the major portion of the ethyl cellulose from the resulting hot clear solution by cooling said solution further to precipitate purified ethyl cellulose, and separating the purified ethyl cellulose from the resulting solution, whereby there is obtained purified ethyl cellulose which gives clear, grainless solutions and tough films.

HAROLD M. SPURLIN.